United States Patent [19]

Frisch

[11] Patent Number: 4,975,559
[45] Date of Patent: Dec. 4, 1990

[54] DEVICE FOR HEATING AND AERATING WATER IN A COFFEE MACHINE

[75] Inventor: Martin Frisch, Reichenburg, Switzerland

[73] Assignee: Nestec S.A., Vevey, Switzerland

[21] Appl. No.: 362,078

[22] Filed: Jun. 6, 1989

[30] Foreign Application Priority Data

Jun. 10, 1988 [CH] Switzerland ............... 2219/88

[51] Int. Cl.⁵ .............. H05B 3/02; F24H 1/12
[52] U.S. Cl. ................... 392/449; 99/295; 392/451
[58] Field of Search ............ 219/302, 303, 305, 298; 99/281, 288; 261/142, 75

[56] References Cited

U.S. PATENT DOCUMENTS

| | | | |
|---|---|---|---|
| 3,411,270 | 11/1968 | Cornelius et al. | 219/302 |
| 3,835,294 | 9/1974 | Krohn et al. | 219/302 |
| 4,687,907 | 8/1987 | Barkley et al. | 219/302 |
| 4,806,375 | 2/1989 | Favre | 99/295 |
| 4,846,052 | 7/1989 | Favre et al. | 99/295 |

FOREIGN PATENT DOCUMENTS

| | | | |
|---|---|---|---|
| 1958301 | 6/1971 | Fed. Rep. of Germany | 219/302 |
| 2429804 | 3/1975 | Fed. Rep. of Germany | 219/302 |
| 106351 | 6/1983 | Japan | 219/303 |
| 605293 | 12/1976 | Switzerland. | |
| 2001741 | 2/1979 | United Kingdom | 219/305 |

Primary Examiner—A. D. Pellinen
Assistant Examiner—Geoffrey S. Evans
Attorney, Agent, or Firm—Vogt & O'Donnell

[57] ABSTRACT

A device for heating and aerating water has a heating element and a water circuit. The water circuit has water circulation channels and air retaining pockets disposed at intervals along the water circulation channels above the normal water level of the channels. The air retaining pockets provide turbulence in circulating water and cause the air retained in the pockets to be dissolved in the water.

8 Claims, 2 Drawing Sheets

DEVICE FOR HEATING AND AERATING WATER IN A COFFEE MACHINE

BACKGROUND OF THE INVENTION

This invention relates to a device for heating water in a coffee machine between a pump and an extraction system.

It is known that espresso coffees can be prepared by injecting hot water under pressure either onto a bed of roasted and packed ground coffee or into a closed cartridge already containing the dose of roasted and ground coffee, for example of the type described in Swiss Patent No. 605 293. On the hand, European Patent application No. 87107012, now European Patent No. 250,810, states steps are required to obtain a good espresso coffee, namely: a first step in which the coffee is prewetted, an aeration step and the actual extraction step. The present invention relates to a device for carrying out the above-mentioned process to obtain good aeration of the extracted coffee using a mixture of the extraction water with the air trapped in the heating element.

SUMMARY OF THE INVENTION

The present invention relates to a device for heating water in a coffee machine between a pump body and an extraction system, comprising a horizontal heating element and a circuit for the circulation of water in the heating element, this circuit being formed by water circulation channels and air-retaining pockets situated above the normal water level.

The pump enables the water to brought to a pressure of up to 20 bar. In the case of an extraction cartridge, the extraction system is, for example, the system described in European patent application No. 871033533, now European Patent No. 242,556.

The water thus circulates through the heating element in channels comprising air pockets so that this air is dissolved in the water on the one hand through turbulence and, on the other hand, under the effect of boiling due to the heating. The important factor is that this dissolving of air in water takes place throughout the extraction process, thus providing the espresso coffee obtained with a lasting froth.

DETAILED DESCRIPTION OF THE INVENTION

In a first of the according to the invention, the water circuit is substantially spiral in shape, the water entering at the periphery and leaving at the centre, and comprises air-retaining pockets opposite the water circulation channels.

Air-retaining pockets may be provided over the entire length of the water circuit. They may also be provided over only part of the water circulation channels. In one embodiment, discontinuous water circulation channels are provided at the periphery, the air-retaining pockets overlapping them to ensure good water flow. This embodiment is shown in FIGS. 1 to 3. In this embodiment, there may be between two and ten discontinuous channels and the same number of air-retaining pockets.

Depending on the cross-section of the water circulation channels and the air-retaining pockets, air may be present to a greater or lesser extent in the pipes. These cross-sections are normally U-shaped, their height being between 5 and 10 mm and their width between 3 and 8 mm.

In a second embodiment of the device according to the invention, the water circuit is substantially helical, the axis of the helix being horizontal, and comprises air-retaining pockets disposed around the upper periphery of the heating element. This device is between 8 and 20 cm long and has a helix pitch of approximately 5 mm. The water circulation channels and the air-retaining pockets are of substantially U-shaped cross-section and have a height of 5 to 10 mm and a width of 3 to 8 mm.

In a third embodiment of the device according to the invention, the water circuit consists of several rings, air-retaining pockets arranged perpendicularly in relation to these rings ensuring the flow of water between two successive rings. This device is between 8 and 20 cm long and comprises approximately ten rings and the same number of air-retaining pockets. As in the previous embodiment, the annular water circulation channels are of subtantially U-shaped cross-section, between 5 and 10 mm in height and between 3 and 8 mm in width.

After each extraction for a cup of coffee, the delivery of water is of course stopped for the entry of air to refill the corresponding pockets.

The invention is described in more detail in the following with reference to the accompanying drawings:

DETAILED DESCRIPTION OF THE DRAWINGS

Figure 1:
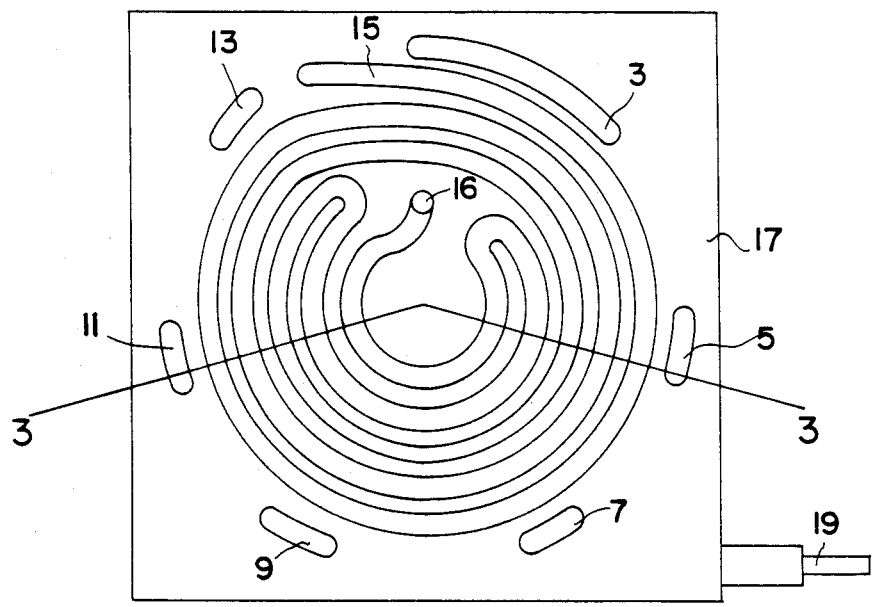
FIG. 1 is a plan view of the lower part of the device according to the invention.
Figure 2:
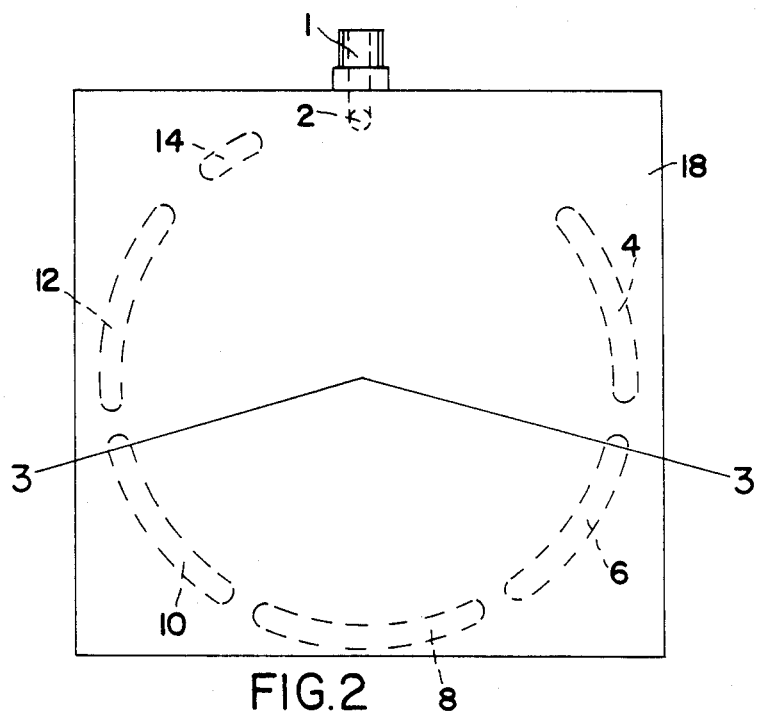
FIG. 2 is a plan view of the upper part of the device according to the invention.
Figure 3:
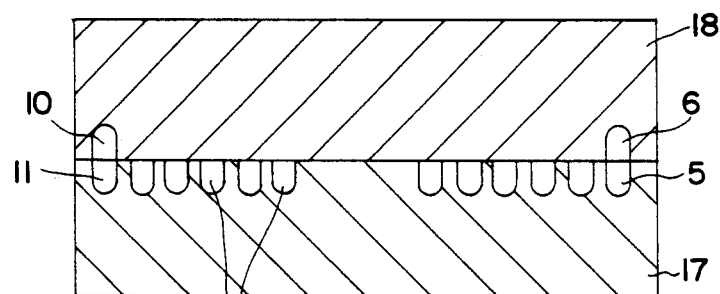
FIG. 3 is a section on the lines 3—3 of FIGS. 1 and 2.

As illustrated in FIGS. 1–3, according to one embodiment of the invention water arrives from the pump (not shown) in the horizontal body (18) through the channel (1), leaves through the opening (2) and arrives in the horizontal body (17) through the water circulation channel (3). The water circulates successively through the water circulation channels and the air-retaining pockets (4) to (14). The coil (15) then leads to the outlet opening (16) and then through the extraction system (not shown).

The plug (19) represents the arrival of current for the resistances for heating the water. The air-retaining pockets can be seen in FIG. 2. As the water advances through the system, the air of these pockets is dissolved in the water. Taking into account the water flow rate, the electrical power of the heating element and the total weight of the device, the air will be dissolved in the water throughout the extraction process to obtain a cup of coffee. Taking into account the sinuous path which the water follows at the periphery, the turbulence thus created provides for thorough mixing of the air with the water.

Figure 4:
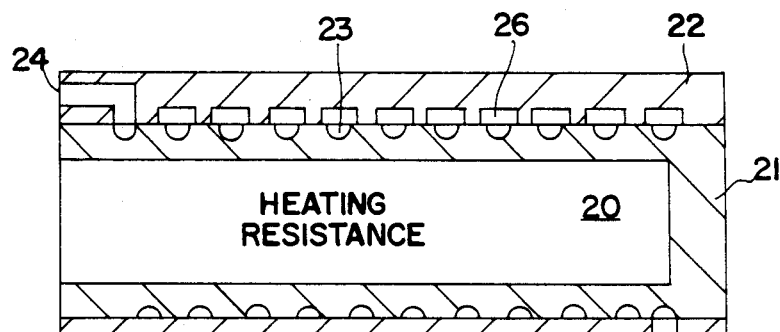
FIG. 4 is a section through the second embodiment of the device ac invention.
Figure 5:
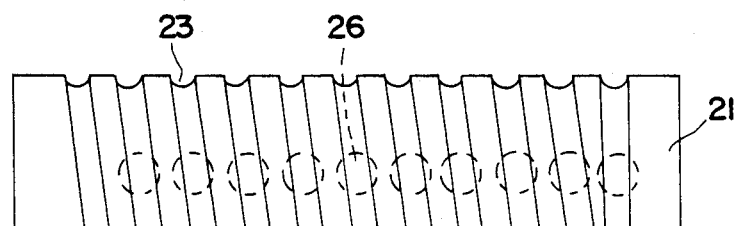
FIG. 5 is a plan view of the cylindrical body of FIG. 4.

The device shown in FIGS. 4 and 5 produces a helical path for the water. The heating resistance (20) is placed at the centre, the cylindrical body (21) and the body (22) defining the water circulation channel (23).

The system is placed horizontally in the coffee machine. The water arrives at (24) and leaves at (25). The air-retaining pockets (26) disposed on the upper part provide for thorough mixing of the air with the water because they are each situated at a distance of one turn of the helix and, hence, ensure good turbulence of the water. By virtue of this dissolution of oxygen and nitrogen in water, the device according to the present invention makes it possible to prepare a good espresso coffee with lasting froth and effective trapping of the volatile aromas of the coffee.

Figure 6:
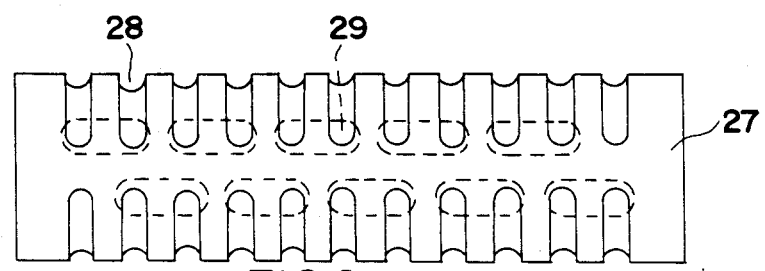
FIG. 6 is a plan view of a third embodiment of the cylindrical body.

FIG. 6 shows only the cylindrical body (27). This body is designed to be engaged in a body similar to that shown at (22) (FIG. 4). The body (27) defines water circulation channels (28) in the shape of rings, retaining pockets (29) formed in the body surrounding the cylindrical body (27) ensuring passage from one ring to the next.

I claim:

1. A device for heating and aerating water in a coffee machine between a pump and an extraction system comprising a heating element and a water circuit for circulating water heated by the heating element, the water circuit comprising water circulation channels extending between a water circuit inlet end and a water outlet end and a plurality of air retaining pockets for retaining air above a normal water level of the channels for providing turbulence and for dissolving retained air in the pockets in water circulated through the channels.

2. A device according to claim 1, wherein the water circuit is substantially spiral and comprises a plurality of discontinuous peripheral channels originating at the water circuit inlet end and a plurality of continuous interior channels terminating at the water circuit outlet end which is centrally disposed in the spiral, the discontinuous peripheral channels being connected by a plurality of overlapping air retaining pockets situated opposite the channels above the normal water level.

3. A device according to claim 2 which comprises between two and ten peripheral discontinuous channels and between two and ten air retaining pockets.

4. A device according to claim 3 wherein the channels and the air retaining pockets have a substantially U-shaped cross-section and have a height of from 5 mm to 10 mm and a width of from 3 mm to 8 mm.

5. A device according to claim 1 wherein the water circuit is substantially helical and comprises a plurality of continuous spaced channels defined by an exterior surface of an elongated cylindrical body and a plurality of air retaining pockets disposed along the exterior surface of the cylindrical body.

6. A device according to claim 5 wherein the elongated cylindrical body has a length of from 8 cm to 20 cm and a helix pitch of approximately 5 mm, and wherein the channels have a substantially U-shaped cross-section and a height of from 5 cm to 10 mm and a width of from 3 mm to 8 mm.

7. A device according to claim 1 wherein the water circuit comprises a plurality of spaced rings defined by an exterior surface of an elongated cylindrical body and a plurality of perpendicularly oriented air retaining pockets disposed above and connecting adjacent rings.

8. A device according to claim 7 wherein the cylindrical body has a length of from 8 cm to 20 cm and comprises approximately ten rings.

* * * * *